United States Patent
Chang et al.

(10) Patent No.: US 7,038,841 B2
(45) Date of Patent: May 2, 2006

(54) FIBER AMPLIFIER AND CONTROL METHOD THEREOF

(75) Inventors: Sun-Hyok Chang, Daejeon (KR);
Hee-Sang Chung, Daejeon (KR);
Jin-Soo Han, Daejeon (KR);
Seung-Kwan Kim, Daejeon (KR);
Won-Kyoung Lee, Busan (KR);
Moo-Jung Chu, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 287 days.

(21) Appl. No.: 10/696,145

(22) Filed: Oct. 28, 2003

(65) Prior Publication Data

US 2004/0196539 A1    Oct. 7, 2004

(30) Foreign Application Priority Data

Mar. 14, 2003 (KR) ............... 10-2003-0016113

(51) Int. Cl.
*H04B 10/12* (2006.01)
*H01S 3/00* (2006.01)

(52) U.S. Cl. ................ 359/334; 359/341.41
(58) Field of Classification Search ........ 359/334, 359/341.41

See application file for complete search history.

(56) References Cited

U.S. PATENT DOCUMENTS 6,178,038 B1    1/2001    Taylor et al.

(Continued)

FOREIGN PATENT DOCUMENTS

| EP | 1033834 | 11/1999 |
|----|---------|---------|
| EP | 1187275 | 9/2001 |
| KR | 10-2000-0069263 | 11/2000 |

(Continued)

OTHER PUBLICATIONS

16-Channel C-Band Hybrid Fiber Amplifier Comprising an EDFA and a Single Diode Laser Pumped Dispersion Compensating Raman Amplifier, 2 pages.

(Continued)

*Primary Examiner*—Jack Keith
*Assistant Examiner*—Eric Bolda
(74) *Attorney, Agent, or Firm*—Blakely Sokoloff Taylor & Zafman

(57) ABSTRACT

A method for realizing, in a fiber amplifier with three stages of amplifiers, automatic gain control in which a constant gain is obtained when channels are varied, and automatic level control in which a constant output per channel is obtained when a light power is varied because of variations in span loss. A light power or another light power of a specific wavelength is monitored to determine when variations in these light powers take place, current values of pump laser diodes appropriate for an input is read from a lookup table, and pump laser diodes are driven. During this operation, a pump power of the first stage amplifier is constantly maintained, and those of the second or third stage amplifier are controlled.

11 Claims, 5 Drawing Sheets

U.S. PATENT DOCUMENTS

| | | | |
|---|---|---|---|
| 6,396,623 B1 * | 5/2002 | Wysocki et al. | 359/337.4 |
| 6,462,862 B1 * | 10/2002 | Kinoshita | 359/334 |
| 6,466,362 B1 * | 10/2002 | Friedrich | 359/334 |
| 6,476,961 B1 | 11/2002 | Ye et al. | |
| 6,738,184 B1 * | 5/2004 | Hayashi et al. | 359/341.4 |
| 6,785,042 B1 * | 8/2004 | Onaka et al. | 359/334 |
| 6,888,670 B1 * | 5/2005 | Oh et al. | 359/334 |
| 2002/0054733 A1 | 5/2002 | Kagi | |
| 2004/0001715 A1 * | 1/2004 | Katagiri et al. | 398/81 |
| 2004/0252999 A1 * | 12/2004 | Onaka et al. | 398/177 |

FOREIGN PATENT DOCUMENTS

KR  1020020039447  5/2002

OTHER PUBLICATIONS

OSA Tops vol. 25, Optical Amplifiers and Their Applications, Douglas M. Baney, Katsumi Emura, and Jay M. Wiesenfeld (eds.), pp. 72-77.

Journal of Lightwave Technology, vol. 19, No. 11, Nov. 2001, pp. 1759-1767.

Smart EDFA with Embedded Control, pp. 419-420.

* cited by examiner

FIBER AMPLIFIER AND CONTROL METHOD THEREOF

CROSS REFERENCE TO RELATED APPLICATION

This application claims priority to and the benefit of Korea Patent Application No. 2003-16113 filed on Mar. 14, 2003 in the Korean Intellectual Property Office, the content of which is incorporated herein by reference.

BACKGROUND OF THE INVENTION (a) Field of the Invention

The present invention relates to an optical power amplifier and a control method thereof. More specifically, the present invention relates to a method for controlling an optical gain and an output power level in a fiber amplifier with a 3-stage optical gain block.

(b) Description of the Related Art

As a result of fast developments in Internet technology, the demand for enhanced transmission capacity has greatly increased. WDM (wavelength division multiplexing) optical transmission systems have been proposed as a way to satisfy such a demand for greater transmission capacity.

An essential requirement of the optical transmission system is the fiber amplifier, which amplifies optical signals so that they may be transmitted a greater distance. The EDFA (Erbium doped fiber amplifier) and the FRA (fiber Raman amplifier) have been extensively used in recent times for amplifiers of the WDM transmission system because they have wide gain bandwidths. In addition to transmission capacity, present-day optical transmission systems require flexibility as network systems, that is, they require control of transmission capacity. Transmission capacity is determined by the number of signal channels and, ideally, the systems are not affected by the add and/or drop of channels that are being transmitted.

In practice, however, the gains of conventional fiber amplifiers of the WDM optical transmission system are varied when the number of signal channels is varied to change input optical power of the amplifier. To solve this problem, an AGC (automatic gain control) function for the fiber amplifier is required to uniformly maintain gain levels.

The transmission span loss may be altered because the transmission span is differently configured or because of other environmental factors. When the transmission span loss is changed, so is the input of the amplifier and, ultimately, the corresponding output of the amplifier. Accordingly, there is the additional need for an ALC (automatic level control) function that enables a constant output to be obtained even when the input is varied because of span loss change.

Many transactions have been published and patents realized that disclose results of obtaining the AGC and the ALC functions in fiber amplifiers (in particular, in the EDFA). K. Motoshima et al. realized the AGC function by monitoring inputs and outputs of each gain block of the EDFA with a 3-stage gain block, and controlling the optical power of pump LDs (laser diode) by an AGC circuit for each gain block (refer to IEEE Journal of Lightwave Technology, Vol. 19, No. 11, pp. 1759~1767, November 2001). A method for realizing the ALC function is disclosed in this transaction in which power of a specific channel is filtered at the final output to measure the optical power, and a variable optical attenuator provided between the first and second stages is controlled so as to provide a constant optical output power.

Although many types of AGC and ALC methods have been disclosed in addition to the above-described method, the method for controlling the output power of pump LDs, for example, as disclosed by K. Motoshima is nevertheless considered to be the most stable and reliable method.

However, since it is necessary, in order to realize AGC and ALC with the use of this method, to provide an additional circuit for each gain block and control gain and output optical power levels so that they remain constant, a corresponding amount of complexity in the circuit results to thereby increase costs. Further, the control circuit needs to be very fast (<5 usec) to suppress the transient effects sufficiently in surviving channels at the output of the amplifier.

SUMMARY OF THE INVENTION

It is an advantage of the present invention to realize the AGC and ALC functions through a simple circuit, and obtain a constant output for each channel irrespective of the number of input channels and input power.

It is another advantage of the present invention to suppress transient effects at the output terminal.

In one aspect of the present invention, a fiber amplifier comprises a first stage amplifier including a first fiber and a first pump laser diode, the first stage amplifier amplifying an input light by a predetermined gain; a second stage amplifier including a second fiber and a second pump laser diode, the second stage amplifier receiving an output light of the first stage amplifier and generating a Raman gain; a third stage amplifier including a third fiber and a third pump laser diode, the third stage amplifier amplifying the light output from the second stage amplifier by a predetermined gain; and an automatic gain controller for receiving part of the light input to the first stage amplifier to check whether an input light power is varied, and when the input light power is varied, controlling pump powers of the second and third pump laser diodes respectively of the second and third stage amplifiers to obtain constant gain, the pump powers of the second and third pump laser diodes being controlled in a state where a pump light of the first pump laser diode of the first stage amplifier is fixed.

In another aspect of the present invention, a fiber amplifier comprises a first stage amplifier including a first fiber and a first pump laser diode, the first stage amplifier amplifying an input light by a predetermined gain; a second stage amplifier including a second fiber and a second pump laser diode, the second stage amplifier receiving an output light of the first stage amplifier and generating a Raman gain; a third stage amplifier including a third fiber and a third pump laser diode, the third stage amplifier amplifying the light output from the second stage amplifier by a predetermined gain; and an automatic level controller for receiving part of the light input to the first stage amplifier to check whether an input light power of a specific channel is varied, and when the input light power of the specific channel is varied, controlling pump powers respectively of the second and third pump laser diodes of the second and third stage amplifiers to obtain a constant output power level, the pump powers of the second and third pump laser diodes being controlled in a state where a pump light of the first pump laser diode of the first stage amplifier is fixed.

In still another aspect of the present invention, a fiber amplifier comprises a first stage amplifier including a first fiber and a first pump laser diode, the first stage amplifier amplifying an input light by a predetermined gain; a second stage amplifier including a second fiber and a second pump laser diode, the second stage amplifier receiving an output light of the first stage amplifier and generating a Raman gain; a third stage amplifier including a third fiber and a third pump laser diode, the third stage amplifier amplifying the light output from the second stage amplifier by a predetermined gain; an automatic gain controller for receiving part of the light input to the first stage amplifier to check whether an input light power is varied, and when the input light power is varied, controlling pump powers of the second and third pump laser diodes respectively of the second and third stage amplifiers to obtain constant gains, the pump powers of the second and third pump laser diodes being controlled in a state where a pump light of the first pump laser diode of the first stage amplifier is fixed; and an automatic level controller for receiving part of the light input to the first stage amplifier to check whether an input light power of a specific channel is varied, and when the input light power of the specific channel is varied, controlling pump powers of the second and third pump laser diodes respectively of the second and third stage amplifiers to obtain a constant output power level, the pump powers of the second and third pump laser diodes being controlled in a state where a pump light of the first pump laser diode of the first stage amplifier is fixed.

In still yet another aspect of the present invention, a control method of a fiber amplifier including a first stage amplifier that has a first fiber and a first pump laser diode for amplifying an input light by a predetermined gain, a second stage amplifier that has a second fiber and a second pump laser diode for receiving an output light of the first stage amplifier and generating a Raman gain, and a third stage amplifier that has a third fiber and a third pump laser diode for amplifying the light output from the second stage amplifier by a predetermined gain, comprises (a) monitoring variations in an input power of a light input to the first stage amplifier; (b) finding a pump power corresponding to the varied input power; and (c) controlling the second and third pump laser diodes based on the found pump powers to obtain a constant gain.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
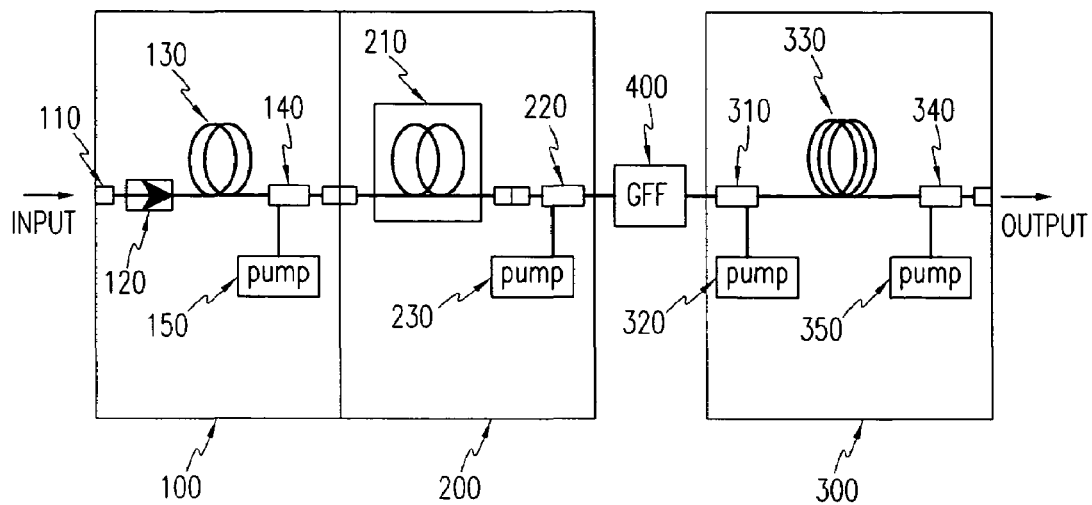
FIG. 1 shows a basic configuration of a fiber amplifier according to a preferred embodiment of the present invention.

FIG. 1 shows a basic configuration of a fiber amplifier according to a preferred embodiment of the present invention.

As shown in the drawing, the fiber amplifier has a 3-stage amplifier configuration.

That is, the fiber amplifier comprises an EDFA 100 which is a first stage amplifier configured to effect high population density inversion, a DCRA (dispersion compensating Raman amplifier) 200 which is a second stage amplifier for performing backward pumping of DCF (dispersion compensating fiber) to obtain a Raman gain, and an EDFA 300 which is a third stage amplifier configured to obtain high output power.

Also, a GFF (gain flattening filter) 400 is coupled between the DCRA 200 and the EDFA 300 to flatten the output gain spectrum.

The first stage amplifier 100 comprises a fiber connector 110, an optical isolator 120, an EDF (Erbium doped fiber) 130, a coupler 140, and a pump LD (laser diode) 150.

The EDF 130 receives light through the fiber connector 110, the pump LD 150 pumps the light to provide pump light to the EDF 130 through the coupler 140 to generate a gain, and the optical isolator 120 is coupled between the EDF 130 and the fiber connector 110 to remove back reflection effects directed from the EDF 130 to the fiber connector 110. Although backward pumping is used in FIG. 1, other pumping methods such as forward pumping or bidirectional pumping can also be used. The wavelength of the pump light was set at 980 nm.

The DCRA 200 comprises a DCF 210, a coupler 220, and a pump LD 230.

The DCF 210 is used for dispersion compensation of an SMF (single mode fiber). A length of the DCF 210 is determined by a length of a single span at the time of transmission. Also, the DCF 210 is coupled using a fiber connector to enable exchanging of a DCF module. The pump LD 230 has a pump wavelength and an optical power at levels to enable a signal light to obtain the Raman gain. The wavelength can be singular or plural.

The pump LD 230 uses a depolarizer or uses two LDs having the same wavelength but different polarizations as a PBC (polarization beam combiner) to get rid of the polarization dependency of the Raman gain.

The pump light output from the pump LD 230 is provided through the coupler 220 to the DCF 210. During this operation, the signal light is output after obtaining the Raman gain.

The EDFA 300 comprises pump LDs 320 and 350, an EDF 330, and couplers 310 and 340.

Figure 2:
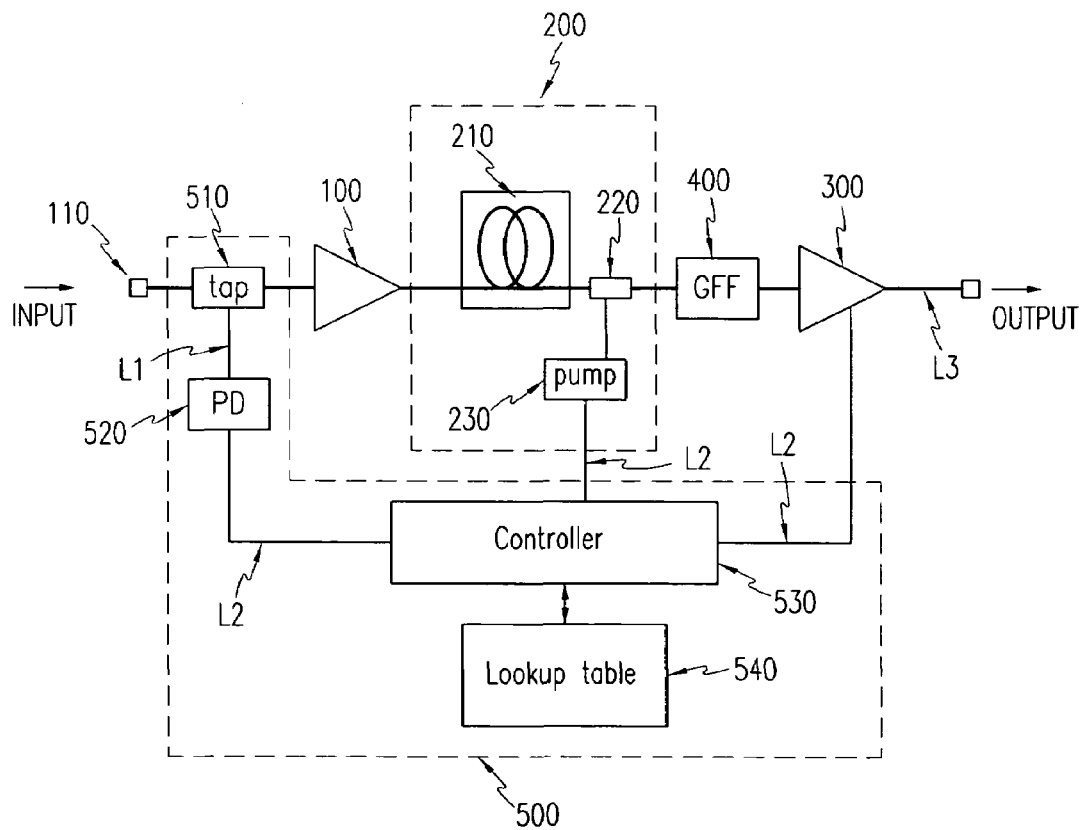
FIG. 2 shows a configuration of a fiber amplifier having an AGC function according to a first preferred embodiment of the present invention.

The EDF 330 is pumped by the pump LDs 320 and 350, and the pump light output from the pump LDs 320 and 350 is provided through the couplers 310 and 340 to the EDF 330. With reference to FIG. 2, the EDFA 300 uses the bidirectional pumping method. However, the EDFA 300 may also use forward pumping or backward pumping. The pump LD 320 uses a wavelength of 980 nm, and the pump LD 350 uses a wavelength of 1,480 nm.

Since the gain obtained by the signal light is altered according to variations in input power in the fiber amplifier shown in FIG. 1, AGC is needed. FIG. 2 shows a configuration of a fiber amplifier having an AGC function according to a first preferred embodiment of the present invention.

As shown in FIG. 2, the fiber amplifier comprises an EDFA 100 which is a first stage amplifier, a DCRA 200 which is a second stage amplifier, an EDFA which is a third stage amplifier, a GFF 400, and an automatic gain controller 500.

Functions and operations of the EDFA 100, the DCRA 200, the EDFA 300, and the GFF 400 according to the first preferred embodiment are very similar to those described with reference to FIG. 1. Therefore, a detailed description of these elements will not be provided.

Referring to FIG. 2, the automatic gain controller 500 comprises a tap 510, a photodetector 520, a controller 530, and a lookup table 540.

Light is provided through the fiber connector 110 and part of this light is input to the automatic gain controller 500 by entering through the tap 510. The photodetector 520 outputs electrical signals corresponding to the power of the light input through the tap 510. A fiber L1 for transmitting light is coupled to the photodetector 520 from the tap 510, and a signal line L2 transmits electrical signals.

The controller 530 receives the electrical signals output from the photodetector 520, and determines whether the input light has changed based on the electrical signals corresponding to the input light power. The lookup table 540 stores driving current values of the pump LD corresponding to the electrical signal values input to the controller 530.

Figure 3:
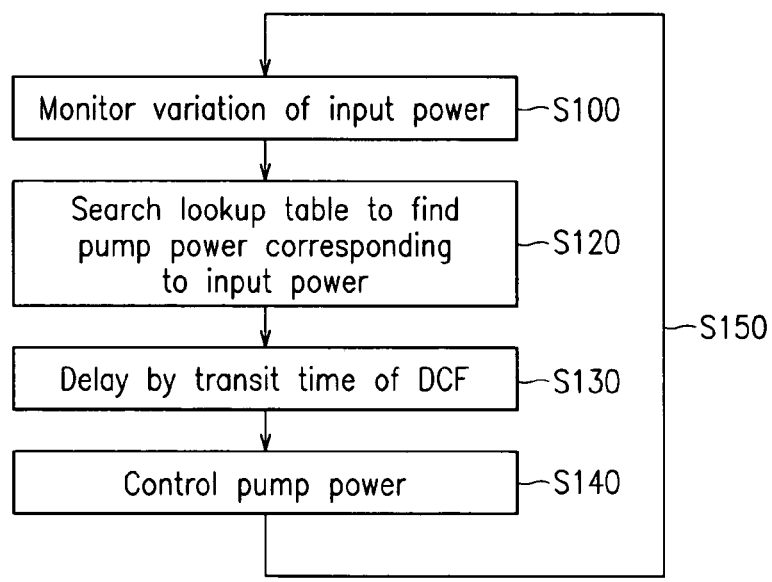
FIG. 3 shows a flowchart for executing the AGC function in the fiber amplifier shown in FIG. 2.

FIG. 3 shows a flowchart for executing the AGC function according to the first preferred embodiment of the present invention.

As shown in FIG. 3, the controller 530 monitors variations in input power in step S100, searches the lookup table 540 to find a pump power corresponding to the varied input power in step S120, performs a delay by a time that corresponds to the transit time of the DCF (i.e., the time for the light to pass through the DCF) in step S130, and controls the pump powers of the pump LD 230 and/or pump LDs 320 and 350 according to the pump powers searched in the lookup table 540 in step S140. The controller 530 repeats the gain control method in step S150.

Describing the gain control method according to the first preferred embodiment in greater detail, the controller 530 reads the driving current of the pump LD 230 and/or pump LDs 320 and 350 corresponding to the varied input value from the lookup table 540 when determining that the input signal has been varied, delays a driving time by the amount of time it takes for the signal light to pass through the DCF 210, and drives the pump LD 230 and/or pump LDs 320 and 350 according to the pump current value read from the lookup table 540. With the method of the first preferred embodiment, the power of the pump LD of the first stage amplifier 100 is not controlled, and only the pump LDs of the DCRA 200 and the EDFA 300 are controlled. Also, the total gain can be controlled by controlling the pump LD of the EDFA 300 while fixing the power of the pump LD of the first stage amplifier 100 and the power of the pump LD 230 of the DCRA 200. In the first preferred embodiment, the optical power at each position can be monitored by coupling the tap 510 and the photodetector 520 to the output of the first stage amplifier 100, the input and output of the DCRA 200, and the input and output of the EDFA 300.

Figure 4:
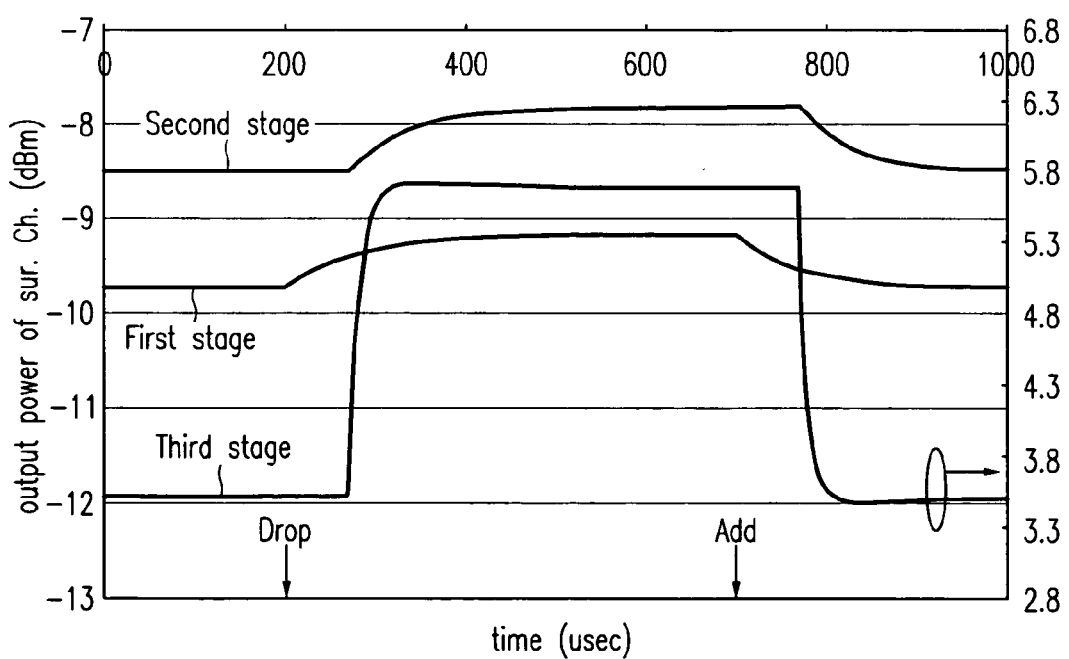
FIG. 4 shows transient effects when no AGC function is used.
Figure 5:
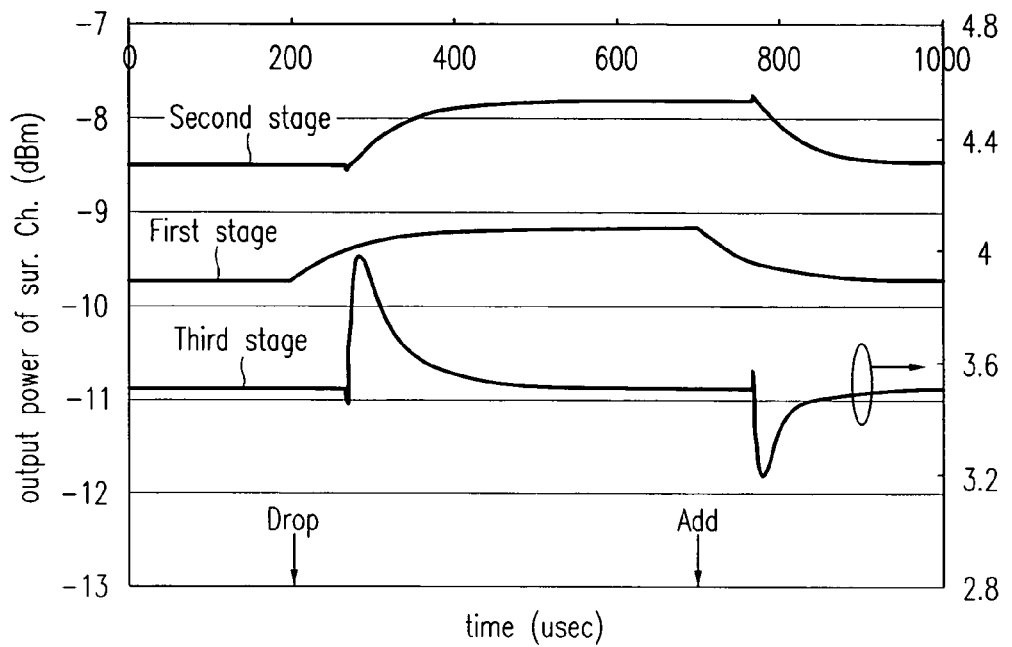
FIG. 5 shows transient effects when the AGC function is used according to a first preferred embodiment of the present invention.

FIG. 4 shows transient effects when no AGC function is used, and FIG. 5 shows transient effects at the output when the AGC function is used according to the first preferred embodiment of the present invention.

To obtain the values of FIGS. 4 and 5, the number of input channels was varied from 80 to 40 channels (decreased by 3 dB, drop) or from 40 to 80 channels (increased by 3 dB, add), and the corresponding input power was set at −21 dBm per channel.

FIG. 4 shows the transient effects at a surviving channel of outputs of the first stage amplifier, the second amplifier DCRA, and the third stage amplifier EDFA when the number of input channels is increased or decreased by 3 dB. It is clear from FIG. 4 that outputs of the surviving channel after dropping a channel increase.

As shown in FIG. 4, the output of the first stage amplifier instantly changes after a channel is dropped, then increases until reaching a value after a response time has passed. The outputs of the second and third stage amplifiers DCRA and EDFA have a time delay before they start to change after channels are dropped. This time delay corresponds to a transit time of the DCF of the signal light (that is, a time for the signal light to pass through the DCF). The output of the third stage amplifier EDFA is a final output of the amplifier, and the output variation of the surviving channel when the input reduces by 3 dB is 2.2 dB. Such an output variation affects transmission to the point where transmission is disabled.

FIG. 5 shows transient effects at the output when the AGC function is used according to the first preferred embodiment of the present invention. The number of input channels is increased or decreased by 3 dB in the same manner as described with reference to FIG. 4.

As shown in FIG. 5, since the pump power of the first stage amplifier is not varied, the output of the first stage amplifier is similar to that described with reference to FIG. 4. Also, the pump power of the second stage amplifier DCRA is fixed to thereby result in the output of the second stage amplifier DCRA being similar to that described with reference to FIG. 4.

Figure 6:
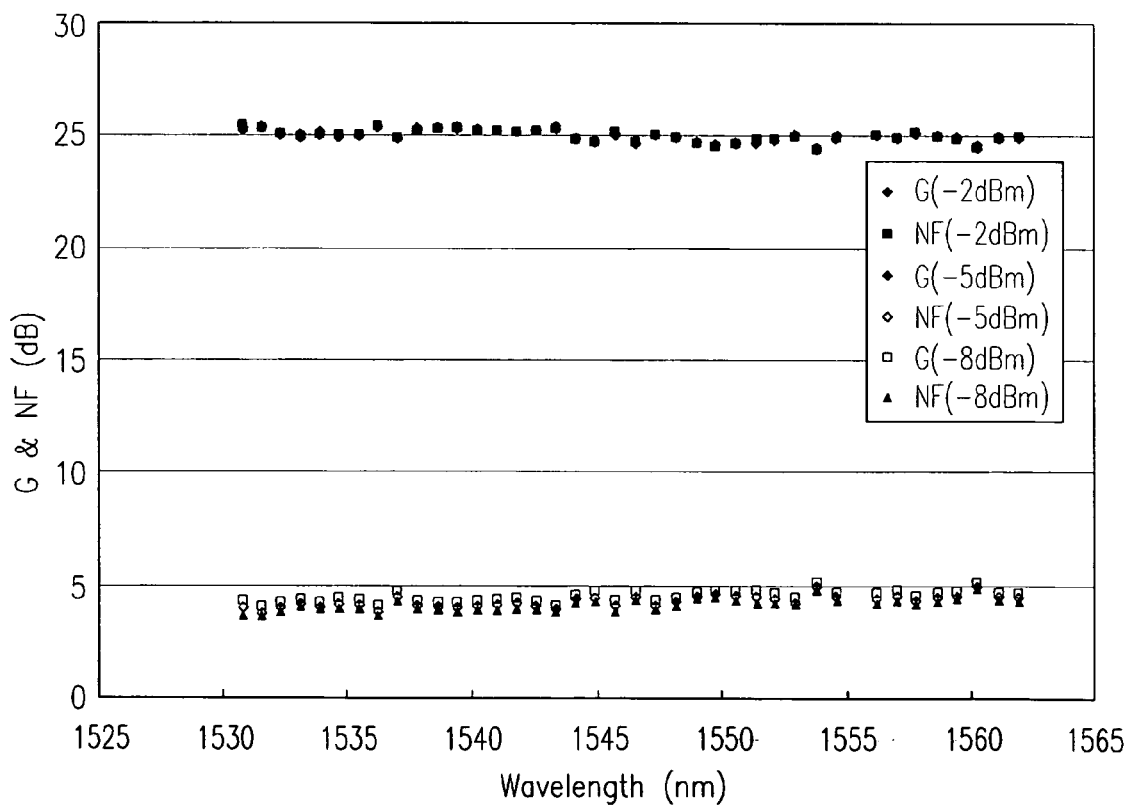
FIG. 6 shows a diagram of measured G (gain) and NF (noise figure) in the fiber amplifier that performs an AGC function according to a first preferred embodiment of the present invention.

According to the preferred embodiment, since the gain of the pump LD is controlled by considering the delay in time until the output starts to undergo variation after a channel is dropped, the shape of the output of the surviving channel is as shown in FIG. 5. It is evident from FIG. 5 that the variations in output of the surviving channel when the input is varied by 3 dB fall within the range of +/−0.5 dB. Hence, the gain is controlled, as are the transient effects. FIG. 6 shows a diagram of measured G (gain) and NF (noise figure) in the fiber amplifier that performs the AGC function according to the first preferred embodiment. The gain and noise figure were measured when the input was set at −2 dBm.

Referring to FIG. 6, the gain value is substantially 25 dB according to the channel, with a deviation within the range of ±0.5 dB. Further, the NF has a value of 5 dB or less.

When the number of channels is dropped by 3 dB and the input is −5 dBm, although the gain value remains at the same level, the NF is reduced. When the number of channels is again dropped by 3 dB and the input is −8 dBm, the gain value continues to remain unchanged whereas the NF is further reduced.

The above-described results show the advantages of the automatic gain control method for fixing the pump power of the first stage amplifier and controlling the pump powers of the DCRA and the EDFA according to the preferred embodiment. That is, the results show that a constant gain value is obtained, while a smaller NF value is obtained in the surviving channel after the drop.

As described above, the gain control method according to the first preferred embodiment has the following advantages over the method by K. Motoshima et al. that uses an additional AGC circuit for each gain block in the EDFA.

First, since AGC is performed by monitoring the input of the fiber amplifier, the preferred embodiment provides a simpler circuit than the conventional method that monitors both the inputs and outputs for each gain block.

Second, since pump powers of the DCRA and EDFA are controlled according to the arrival time of the signal light by using the transit time of the DCF, the transient effects at the output are substantially reduced.

In a conventional EDFA, since a time delay is generated that extends until the controller starts operation to control the pump power after the signal light has reached the gain block, the transient effects are significant. Accordingly, to improve this situation, it is necessary to use a controller or an AGC circuit with very fast response times.

Third, since the pump power of the first stage amplifier is fixed, the gain of the first stage amplifier increases when the number of input channels reduces. Therefore, the NF of the amplifier is further reduced.

Figure 7:
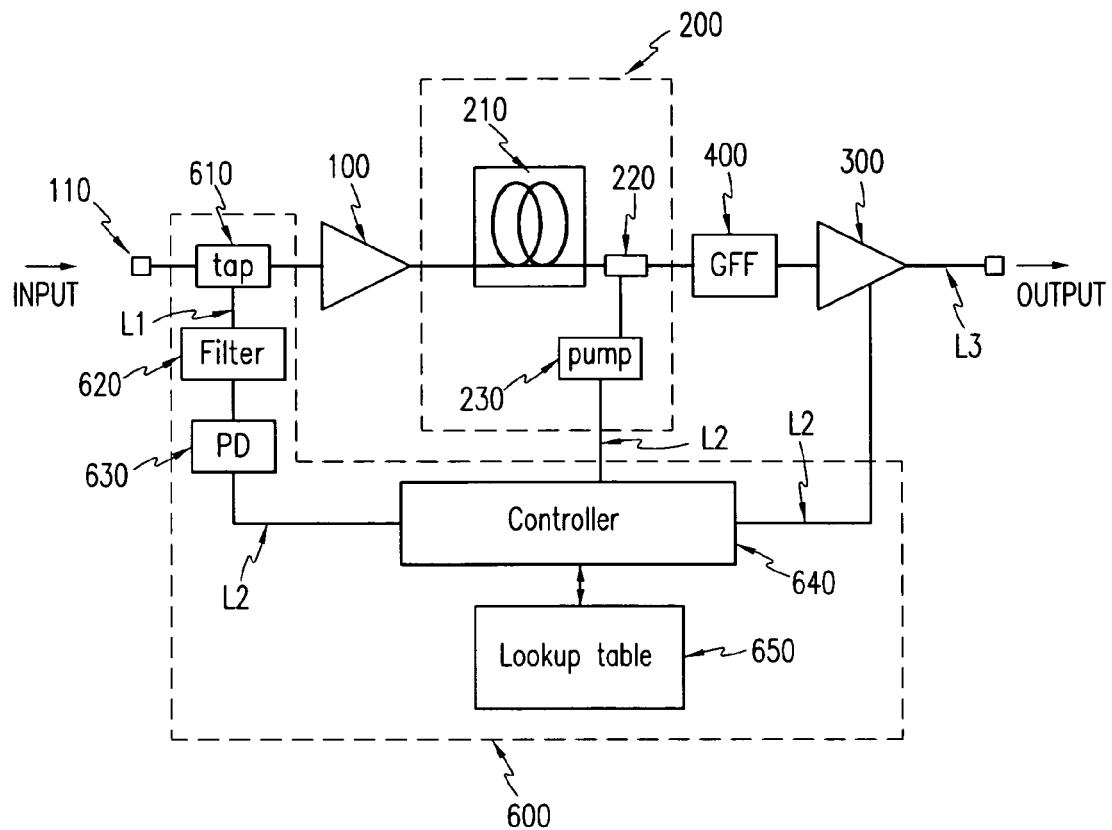
FIG. 7 shows a configuration of a fiber amplifier having an ALC function according to a second preferred embodiment of the present invention.

FIG. 7 shows a configuration of a fiber amplifier having an ALC function according to a second preferred embodiment of the present invention. As shown in FIG. 7, the fiber amplifier comprises an EDFA 100 which is a first stage amplifier, a DCRA 200 which is a second stage amplifier, an EDFA 300 which is a third stage amplifier, a GFF 400, and an automatic level controller 600.

Functions and operations of the EDFA 100, the DCRA 200, the EDFA 300, and the GFF 400 according to the second preferred embodiment are very similar to those of FIG. 1, and so a description of these elements will not be provided.

As shown in FIG. 7, the automatic level controller 600 comprises a tap 610, an optical filter 620, a photodetector 630, a controller 640, and a lookup table 650.

Part of light provided through the fiber connector 110 is input to the automatic level controller 600 by entering through the tap 610. The optical filter 620 filters the input light power separated in the tap 610 to allow only optical power of a predetermined wavelength to pass through to the photodetector 630. This predetermined wavelength is one of the signal channels, or a wavelength outside of the signal light band that is additionally provided from an amplifier of a previous span. The tap 610 and the optical filter 620 can be substituted with a WDM coupler that performs both of these functions (i.e., the functions of the tap 610 and the optical filter 620).

The photodetector 630 outputs electrical signals corresponding to the light power passed through the optical filter 620.

Figure 8:
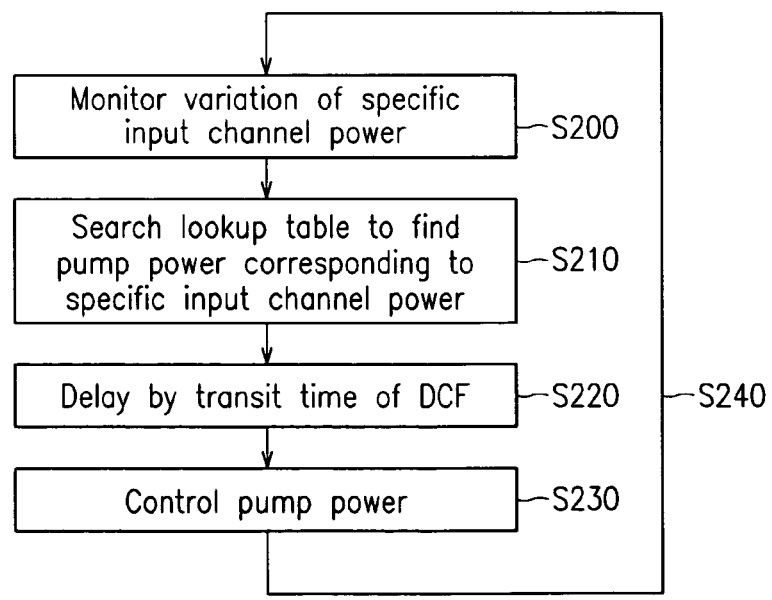
FIG. 8 shows a flowchart for executing the ALC function in the fiber amplifier shown in FIG. 7.

The controller 640 receives the electrical signals corresponding to the light power of a specific input channel output from the photodetector 630, and determines whether the input light of the specific input channel has changed based on the received electrical signals. The lookup table 650 stores driving current values of the pump LDs corresponding to the electrical signal values input to the controller 640. FIG. 8 shows a flowchart of the ALC method according to the second preferred embodiment of the present invention.

As shown in FIG. 8, the controller 640 monitors power variations of a specific input channel in step S200, searches the lookup table 650 to find pump powers corresponding to the power of the specific input channel that has been varied in step S210, performs a delay by an amount of time that corresponds to the transit time of the DCF (i.e., the time for the light to pass through the DCF) in step S220, and controls the pump powers of the pump LDs according to the pump powers searched in the lookup table in step S230. The controller 530 repeats the output power level control method in step S240.

Describing the ALC method according to the second preferred embodiment in greater detail, the controller 640 reads the driving currents of the pump LD 230 and/or the pump LDs 320, 350 that matches the varied input value from the lookup table 650 when determining that the input signal corresponding to the power of a specific channel has been varied, performs a delay by an amount of time it takes for the signal light to pass through the DCF 210, and drives the pump LD 230 and/or the pump LDs 320, 350 according to the pump current values read from the lookup table 650. With the method the second preferred embodiment, the power of the pump LD of the first stage amplifier 100 is not controlled, and only the pump LDs of the DCRA 200 and the EDFA 300 are controlled.

Figure 9:
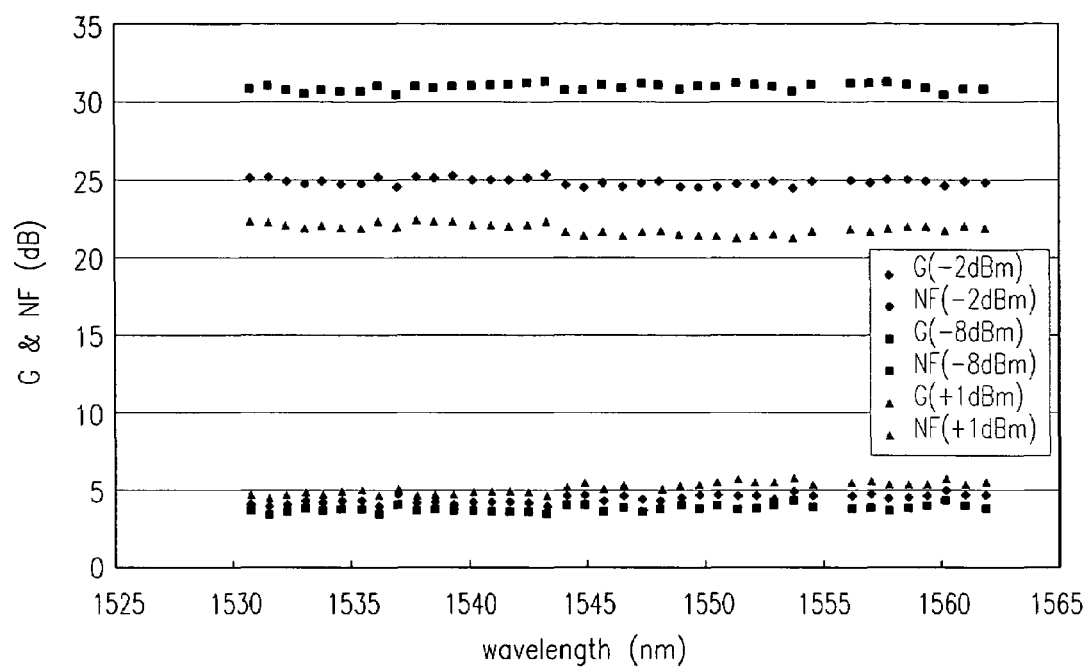
FIG. 9 shows a diagram of measured G (gain) and NF (noise figure) in the fiber amplifier that performs an ALC function according to a second preferred embodiment of the present invention.

FIG. 9 shows a diagram of measured G (gain) and NF (noise figure) in the fiber amplifier that performs the ALC function according to the second preferred embodiment of the present invention. Examining the case where the input is −2 dBm (80 channels, and −21 dBm per channel), the gain is measured at 25 dB and the NF at 5 dB or less. Therefore, the output is measured at 23 dBm, that is, 4 dBm for each channel. When a span loss is changed and the input is changed to +1 dBm (−18 dBm per channel), the gain is measured at 22 dB and the NF is slightly worsened. As in the above case, the output in this instance is 23 dBm, with 4 dBm being maintained for each channel. When the span loss is changed and the input is changed to −8 dBm (−27 dBm per channel), the gain is 31 dB and the NF is improved. The output in this instance is 23 dBm with 4 dBm being maintained for each channel, again identically as in the above first case. In this experiment, the pump powers of the first and third amplifiers are not changed, and only that of the DCRA is changed. The gain deviation for each case is ±0.5 dB, indicating that gain flatness is well maintained. That is, even though variations in span loss are from +3 to −6 dBm (i.e., a very large value change) and only the pump power of the DCRA is controlled, gain flatness is well maintained and a constant output per channel is obtained.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

For example, the AGC and the ALC functions can be concurrently realized by integrating the circuit diagrams of FIGS. 2 and 7. Such integration can be easily performed by a person skilled in the art by the coupling of elements to an input unit. Further, although an EDFA is used for both the first and third stage amplifiers, it is also possible to use a rare-earth doped fiber amplifier, a Raman amplifier, a semiconductor amplifier, a waveguide amplifier, and a parametric amplifier.

As described in the above, the AGC and ALC functions are realized by controlling not the pump power of the first stage amplifier but the pump powers of either the second or third stage amplifiers, thereby enabling faster control. Also, the transient effects at the output are substantially reduced since the pump power of one of the second and third stage amplifiers is controlled by effecting a delay by an amount of time equal to the transit time of the DCF.

What is claimed is:

1. A fiber amplifier comprising:
    a first stage amplifier including a first fiber and a first pump laser diode, the first stage amplifier amplifying an input light by a predetermined gain;
    a second stage amplifier including a second fiber and a second pump laser diode, the second stage amplifier receiving an output light of the first stage amplifier and generating a Raman gain;
    a third stage amplifier including a third fiber and a third pump laser diode, the third stage amplifier amplifying the light output from the second stage amplifier by a predetermined gain; and
    an automatic gain controller configured for receiving part of the light input to the first stage amplifier to check whether an input light power is varied, and when the input light power is varied, controlling pump powers of the second and third pump laser diodes respectively of the second and third stage amplifiers to obtain a constant gain, the pump powers of the second and third pump laser diodes being controlled in a state where a pump light of the first pump laser diode of the first stage amplifier is fixed.

2. The fiber amplifier of claim 1, wherein the second fiber is a dispersion compensating fiber.

3. The fiber amplifier of claim 2, wherein one of the first and third fibers is an Erbium doped fiber.

4. The fiber amplifier of claim 1, further comprising a gain flattening filter coupled between the second and third stage amplifiers for flattening an output gain.

5. The fiber amplifier of claim 1, wherein the automatic gain controller comprises:
    a photodetector configured for receiving part of an input light of the first stage amplifier, and outputting an electrical signal corresponding to power of the input light; and
    a controller configured for checking whether the input light power is varied based on the electrical signal output by the photodetector, and controlling the second and third pump laser diodes using pump powers corresponding to the varied power of the input light.

6. The fiber amplifier of claim 5, wherein the second fiber is a dispersion compensating fiber, and
    the controller performs a delay by an amount of time equal to the transit time of the dispersion compensating fiber to control the second and third pump laser diodes.

7. The fiber amplifier of claim 5, wherein the automatic gain controller further comprises a lookup table for storing driving current values of pump laser diodes corresponding to the electrical signal value input to the controller, and
    the controller searches for driving current values of the pump laser diodes corresponding to the electrical signal in the lookup table when the electrical signal output by the photodetector is found to be varied, and controls the second and third pump laser diodes based on the driving current value found in the lookup table.

8. The fiber amplifier defined by claim 1 wherein when the input light power is varied, said automatic gain controller operates controlling pump powers of the second and third pump laser diodes respectively of the second and third stage amplifiers to obtain a constant gain, the pump powers of the second and third pump laser diodes being controlled in a state where a pump light of the first pump laser diode of the first stage amplifier is fixed.

9. A control method of a fiber amplifier including a first stage amplifier that has a first fiber and a first pump laser diode for amplifying an input light by a predetermined gain, a second stage amplifier that has a second fiber and a second pump laser diode for receiving an output light of the first stage amplifier and generating a Raman gain, and a third stage amplifier that has a third fiber and a third pump laser diode for amplifying the light output from the second stage amplifier by a predetermined gain, comprising:
    (a) monitoring variations in an input power of a light input to the first stage amplifier;
    (b) finding pump powers corresponding to the varied input power; and
    (c) controlling the second and third pump laser diodes based on the found pump powers to obtain a constant gain.

10. The control method of claim 9, wherein the second fiber is a dispersion compensating fiber, and
    (c) comprises performing a delay by an amount of time equal to the transit time of the dispersion compensating fiber to control the second and third pump laser diodes.

11. The control method of claim 9, wherein (a) comprises:
    receiving part of the light input to the first stage amplifier;
    outputting an electrical signal corresponding to a power of the input light; and
    checking whether the input light power is varied based on the output electrical signal value.

* * * * *